(12) United States Patent
Chandrasekar et al.

(10) Patent No.: US 8,903,025 B1
(45) Date of Patent: Dec. 2, 2014

(54) LOW COMPLEXITY TECHNIQUE FOR DETECTING DATA IN A RECEIVED MULTIPLE-INPUT-MULTIPLE-OUTPUT (MIMO) SIGNAL

(71) Applicant: Marvell International Ltd., Hamilton (BM)

(72) Inventors: Manikandan Chandrasekar, Chennai (IN); Ping Gao, Cupertino, CA (US); Lokesh Sundaramurthy Satrasala, Bangalore (IN); Swaroop Venkatesh, Dublin, CA (US); Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/058,627

(22) Filed: Oct. 21, 2013

Related U.S. Application Data

(60) Provisional application No. 61/717,931, filed on Oct. 24, 2012.

(51) Int. Cl.
*H04L 27/06* (2006.01)
*H04L 27/26* (2006.01)
*H04L 1/00* (2006.01)
*H04L 25/03* (2006.01)

(52) U.S. Cl.
CPC ........... *H04L 27/2647* (2013.01); *H04L 1/0054* (2013.01); *H04L 25/03318* (2013.01)
USPC ............................. 375/340; 375/341; 714/794

(58) Field of Classification Search
CPC .............. H04L 25/0204; H04L 25/067; H04L 25/03318; H04L 1/0054
USPC .................................. 375/340–341; 714/794
See application file for complete search history.

(56) References Cited

U.S. PATENT DOCUMENTS

2009/0060078 A1*  3/2009  van Zelst et al. .............. 375/262
2012/0014483 A1*  1/2012  Shabany et al. ............... 375/341

* cited by examiner

*Primary Examiner* — Curtis Odom (57) ABSTRACT

Systems and methods for detecting data in a received multiple-input-multiple-output signal are provided. First, second, and third signals are received and form a vector y. The received signals are associated with first, second, and third data values that form a vector x. A channel matrix (H) is received, and a QR decomposition of the channel matrix is performed, such that H=QR. The vector y is transformed into a vector z according to $z=Q^H y$. A distance value between the rector z and the vector x is determined for each possible third data value. A nearest constellation point is calculated based on a first of the possible third data values. The calculating step is repeated for each of the possible third data values to generate a set of constellation point triplets. The distance values are determined using the set of constellation point triplets.

20 Claims, 5 Drawing Sheets

LOW COMPLEXITY TECHNIQUE FOR DETECTING DATA IN A RECEIVED MULTIPLE-INPUT-MULTIPLE-OUTPUT (MIMO) SIGNAL

CROSS-REFERENCE TO RELATED APPLICATIONS

This disclosure claims priority to U.S. Provisional Patent Application No. 61/717,931, filed on Oct. 24, 2012, the entirety of which is incorporated herein by reference.

TECHNICAL FIELD

The technology described in this document relates generally to signal receivers and more particularly to a low complexity computation technique used for detecting data in a received multiple-input-multiple-output (MIMO) signal.

BACKGROUND

In the field of wireless communications, MIMO-OFDM (Multiple-Input and Multiple-Output, Orthogonal Frequency-Division Multiplexing) technology has been used to achieve increased data throughput and link range without requiring additional bandwidth or increased transmission power. MIMO-OFDM technology utilizes multiple transmission antennas at a transmitter and multiple receiving antennas at a receiver to enable a multipath rich environment with multiple orthogonal channels existing between the transmitter and the receiver. Data signals are transmitted in parallel over these channels, and as a result, both data throughput and link range are increased. Due to these advantages, MIMO-OFDM has been adopted in various wireless communication standards, such as IEEE 802.11n/11ac, 4G, 3GPP Long Term Evolution (LTE), WiMAX, and HSPA+.

SUMMARY

The present disclosure is directed to systems and methods for detecting data in a received multiple-input-multiple-output (MIMO) signal. In general, in one aspect, this specification discloses a method of detecting data in a received MIMO signal, where a first signal (y1), a second signal (y2), and a third signal (y3) are received, via a transmission channel, on first, second, and third spatial streams, respectively. The received signals are associated with first data values (x1), second data values (x2), and third data values (x3). The first signal, the second signal, and the third signal are formed into a received signal vector y. The first data values, the second data values, and the third data values are formed into a vector x. A channel matrix (H) representing effects of the transmission channel on the first data values, the second data values, and the third data values is received. A QR decomposition of the channel matrix is performed, such that H=QR, where Q matrix is a unitary matrix and R matrix is an upper triangular matrix. The received signal vector y is transformed into a rotated received signal vector z according to $z=Q^H y$. A distance value between the vector z and the vector x is determined for each possible third data value (x3). To determine the distance value, a nearest constellation point is calculated based on a first of the possible third data values (x3), where the nearest constellation point minimizes a distance between vector z and vector x. The calculating step is repeated for each of the possible third data values (x3) to generate a set of constellation point triplets. One constellation point triplet is associated with each of the possible third data values (x3). A distance value between the vector z and the vector x is determined using the set of constellation point triplets, and further using elements of the channel matrix, where one distance value is associated with each of the constellation point triplets of the set. One or more log likelihood ratio (LLR) values are determined based on the determined distance values.

In general, in another aspect, this specification discloses a method for detecting data in a received multiple-input-multiple-output (MIMO) signal, where a first signal ($y_1$), a second signal ($y_2$), and a third signal ($y_3$) are received, via a transmission channel, on first, second, and third spatial streams, respectively. The received signals are associated with first data values ($x_1$), second data values ($x_2$), and third data values ($x_3$). The first, second, and third signals form a y-vector ($[y_1, y_2, y_3]^T$), the first, second, and third data values form an x-vector ($[x_1, x_2, x_3]^T$). A channel matrix (H) representing effects of the transmission channel on the one or more first data values, the one or more second data values, and the one or more third data values is received. A QR decomposition of the channel matrix is performed, such that H=QR, where Q matrix is a unitary matrix and R matrix is $$\begin{bmatrix} r_{11} & r_{12} & r_{13} \\ 0 & r_{22} & r_{23} \\ 0 & 0 & r_{33} \end{bmatrix}.$$

The y-vector is transformed to a z-vector ($[z_1, z_2, z_3]^T$) according to $z=Q^H y$. A distance value between the z-vector and the x-vector is determined for each possible third data value ($x_3$). The determining includes calculating a particular second data value ($x_2$) that minimizes a term $|z_2 - r_{22} x_2 - r_{23} x_3|^2$ for a first of the possible third data values ($x_3$). The determining also includes calculating a particular first data value ($x_1$) that minimizes a term $|z_1 - r_{11} x_1 - r_{12} x_2 - r_{13} x_3|^2$ for the first of the possible third data values ($x_3$) and the particular second data value ($x_2$). A distance value between the z-vector and the x-vector is calculated for the first of the possible third data values ($x_3$) using the particular second data value ($x_2$) and the particular first data value ($x_1$). The calculating steps are repeated for each of the possible third data values ($x_3$) so that one distance value is associated with each possible third data value ($x_3$). One or more log likelihood ratio (LLR) values are determined based on the determined distance values. The third data value ($x_3$) is decoded based on the one or more LLR values.

In general, in another aspect, this specification discloses a system for detecting data in a received multiple-input-multiple-output (MIMO) signal that includes one or more antennas configured to receive, via a transmission channel, a first signal (y1), a second signal (y2), and a third signal (y3) on first, second, and third spatial streams, respectively. The received signals are associated with first data values (x1), second data values (x2), and third data values (x3). The first signal, the second signal, and the third signal form a received signal vector y, and the first data values, the second data values, and the third data values form a vector x. The system also includes a QR decomposer configured to transform a channel matrix (H) representing effects of the transmission channel on the first data values, the second data values, and the third data values. The channel matrix is transformed via a QR decomposition, such that H=QR, where Q matrix is a unitary matrix and R matrix is an upper triangular matrix. A matrix transformer is configured to transform the received signal vector y into a rotated received signal vector z according to $z=Q^H y$. The system further includes a distance value determiner configured to determine a distance value between the vector z and the vector x for each possible third data value (x3). To determine the distance value, a nearest constellation point is calculated based on a first of the possible third data values (x3), where the nearest constellation point minimizes a distance between vector z and vector x. The calculating step is repeated for each of the possible third data values (x3) to generate a set of constellation point triplets. One constellation point triplet is associated with each of the possible third data values (x3). A distance value between the vector z and the vector x is determined using the set of constellation point triplets, and further using elements of the channel matrix, where one distance value is associated with each of the constellation point triplets of the set.

DETAILED DESCRIPTION

Figure 1:
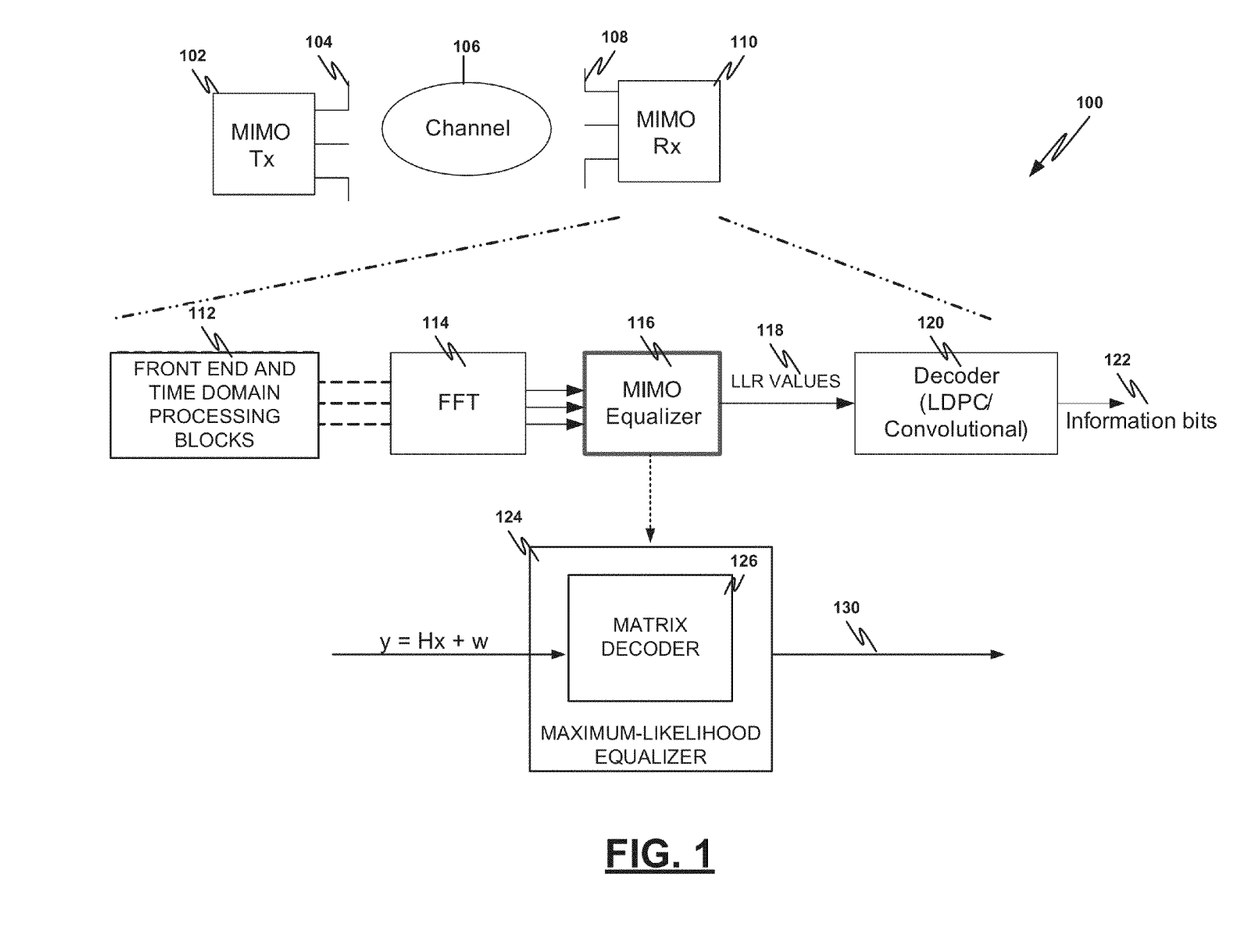
FIG. 1 is a block diagram of an example multiple-input-multiple-output (MIMO) communication system including a MIMO transmitter, MIMO receiver, and channel.

FIG. 1 is a block diagram 100 of an example multiple-input-multiple-output (MIMO) communication system including a MIMO transmitter 102, MIMO receiver 110, and channel 106. The MIMO communication system allows more than one spatial stream to be transmitted, and in the example of FIG. 1, three spatial streams are used. In the MIMO transmitter 102, data to be transmitted is provided as a stream of 1's and 0's to an encoder. The encoder encodes the data to be transmitted with, for example, an error correcting code. The output of the encoder is provided to a spatial stream splitter and divided into three spatial streams. These spatial streams are then propagated to a frequency modulator and frequency modulated into symbols, which may be represented as a sequence of complex numbers. The frequency modulated signals are then sent through three antennas 104 and transmitted through the transmission channel 106. The transmission channel 106 may include, for example, air. The three antennas 104 correspond to the three spatial streams to be transmitted. In other examples, fewer than three antennas are used, or more than three antennas are used.

In the example illustrated in FIG. 1, using three antennas 108, the MIMO receiver 110 receives the three spatial stream signals from the transmission channel 106. In the MIMO receiver 110, the received spatial streams are processed by front end and time domain processing blocks 112 (e.g., analog-to-digital conversion blocks, digital to analog-conversion blocks, etc.). The output of the front end and time domain processing blocks 112 is provided to a fast Fourier Transform (HT) module 114 and converted from a time domain representation to a frequency domain representation. The converted spatial streams are then propagated to a MIMO equalizer 116. The MIMO equalizer 116 then calculates log-likelihood ratio (LLR) values 118 for each of the received spatial streams. The MIMO equalizer 116 operates in the frequency domain and is configured to remove the channel effects on the received spatial streams. The calculated LLR values 118 are combined by a LLR combiner and provided to a decoder 120. The decoder 120 may be, for example, a low-density parity-check (LDPC) decoder or a convolutional decoder. The decoder 120 decodes the received spatial streams using the LLR values provided by the combiner and generates informational bits output data 122.

Specifically, the MIMO equalizer 116 may be a maximum-likelihood equalizer 124 that utilizes a matrix decoder 126 to perform distance and LLR calculations. As described below, the matrix decoder 126 generates approximate maximum-likelihood solutions using an algorithm that has a low computational complexity. The matrix decoder 126 offers substantially identical error performance as compared to techniques having higher complexity (e.g., an exhaustive, brute force search methodology). As described in further detail below, the algorithms used by the matrix decoder 126 have a lower complexity as compared to exhaustive search or brute force algorithms, potentially offering large savings in required hardware and computation time as well as higher throughput. The algorithms used by the matrix decoder 126 balance complexity and performance and may result in a performance improvement in a rate-versus-range metric when using three spatial streams. Using the maximum-likelihood approximations described herein, it may be possible to sustain higher throughputs fir longer distances as compared to conventional solutions.

The matrix decoder 126 receives, via the three antennas 108, a first signal, a second signal, and a third signal transmitted through the channel 106. The matrix decoder 126 utilizes a low complexity algorithm and computes LLR values based on the received signals. Specifically, the received first, second, and third signals may be represented by the equation y=Hx+n, where y represents the received signals at the MIMO receiver 110, x represents the data values of the symbols in the spatial streams transmitted by the MIMO transmitter 102, H is a channel matrix representing combined effects of the transmission channel 106 and spatial mapping of the MIMO transmitter 102 on the transmitted signal, and n represents noise. In the three spatial stream case, y is a 3×1 vector ($[y_1,y_2,y_3]^T$), x is a 3×1 vector ($[x_1,x_2,x_3]^T$), H is a 3×3 vector $$\begin{bmatrix} h_{11} & h_{12} & h_{13} \\ h_{21} & h_{22} & h_{23} \\ h_{31} & h_{32} & h_{33} \end{bmatrix},$$

and n is a 3×1 vector ($[n_1, n_2, n_3]^T$). Thus, a 3×3 MIMO system with the three spatial streams may be described by the following equation:

$$\underbrace{\begin{bmatrix} y_1 \\ y_2 \\ y_3 \end{bmatrix}}_{y} = \underbrace{\begin{bmatrix} h_{11} & h_{12} & h_{13} \\ h_{21} & h_{22} & h_{23} \\ h_{31} & h_{32} & h_{33} \end{bmatrix}}_{H} \underbrace{\begin{bmatrix} x_1 \\ x_2 \\ x_3 \end{bmatrix}}_{x} + \underbrace{\begin{bmatrix} n_1 \\ n_2 \\ n_3 \end{bmatrix}}_{n}.$$

Assuming an additive white Gaussian noise (AWGN) model and perfect channel estimation, a maximum likelihood equalizer seeks optimal estimates of symbols $x_1$, $x_2$, and $x_3$ so as to minimize a Euclidian distance:

$$\|y - Hx\|^2 = \sum_{i=1}^{3} |y_i - h_{i1}x_1 - h_{i2}x_2 - h_{i3}x_3|^2.$$

An exact maximum likelihood solution corresponds to the triplet of symbols ($x_1$, $x_2$, $x_3$) that minimizes the Euclidean distance above by performing an exhaustive, brute-force search of the 3-dimensional space. For higher-order constellations, such as 64-QAM or 256-QAM, this involves a search over $64^3$ or $256^3$ symbols in parallel for each tone. This leads to prohibitive complexity, as in addition, there could be as many as 256 tones (or OFDM subcarriers) for 802.11ac that need to be processed simultaneously.

As described above, the MIMO equalizer 116 of FIG. 1 utilizes the matrix decoder 126 to perform distance and LLR calculations using a maximum likelihood approximation procedure. The maximum likelihood approximation procedure may offer substantially identical error performance as compared to the above-described exhaustive, brute-force search methodology, while being of a lower complexity. The lower complexity maximum likelihood approximation approach is described in further detail below with reference to FIGS. 2-5.

Figure 2:
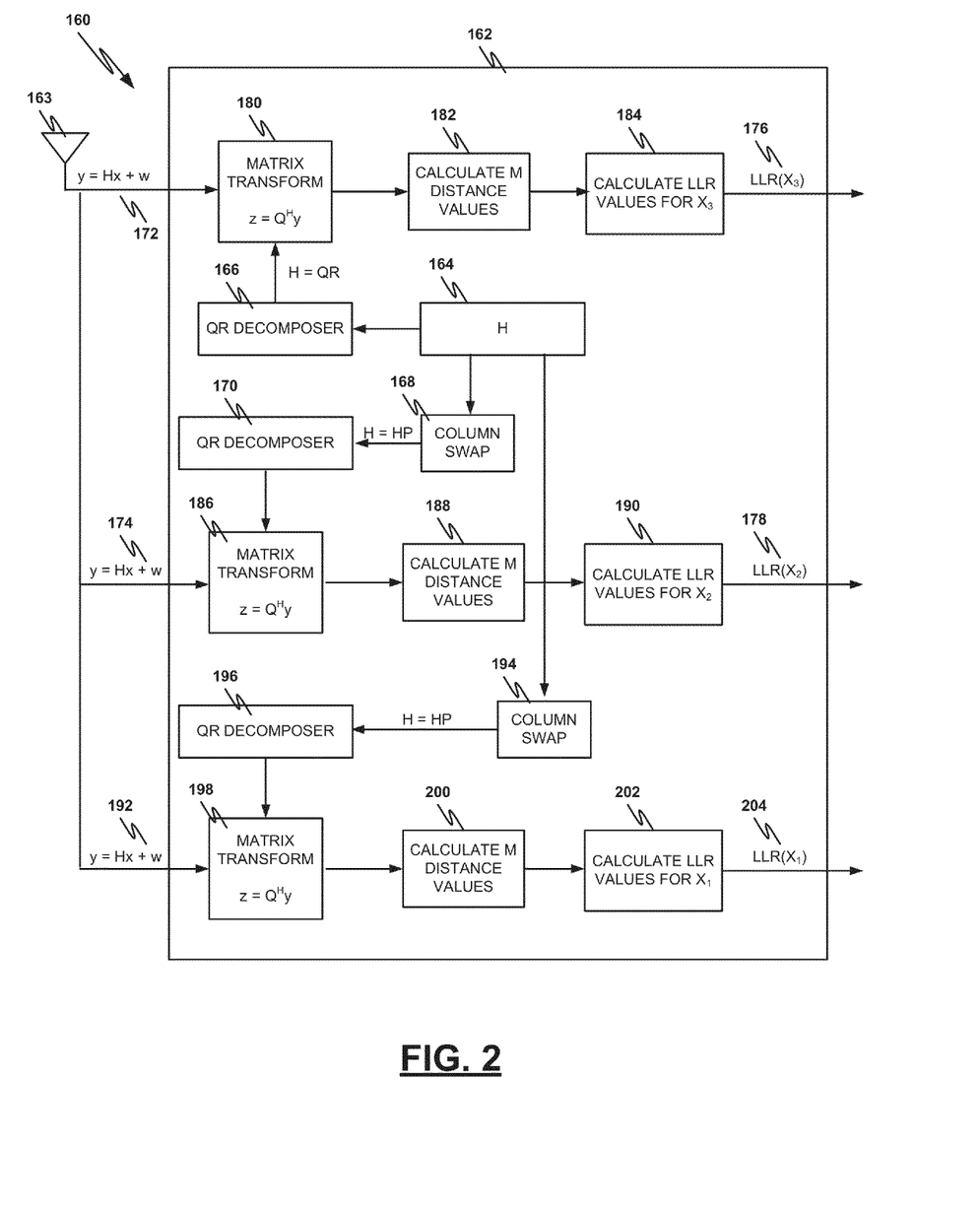
FIG. 2 is a block diagram illustrating internal components of an example matrix decoder for use in a maximum-likelihood receiver, where the example matrix decoder implements a maximum-likelihood algorithm for determining log-likelihood ratio ("LLR") values for three spatial streams.

FIG. 2 is a block diagram 160 illustrating internal components of an example matrix decoder 162 for use in a maximum-likelihood receiver, where the example matrix decoder implements a maximum-likelihood algorithm for determining log-likelihood ratio ("LLR") values for three spatial streams. Prior to receiving data signals over the one or more antennas 163, matrix calculations are done with respect to the known channel matrix H 164. As illustrated at 166, a QR decomposition of the H matrix 164 may be performed such that H=QR. The Q matrix is a unitary matrix, and the R matrix may be an upper triangular matrix represented as R=

$$\begin{bmatrix} r_{11} & r_{12} & r_{13} \\ 0 & r_{22} & r_{23} \\ 0 & 0 & r_{33} \end{bmatrix}.$$

A similar QR decomposition procedure is performed at 170, 196 using a permutated channel matrix, as described in greater detail below. At 168 and 194, the channel matrix H 164 is multiplied by a permutation matrix. In the current example including three spatial streams, the permutation matrices used at 168 and 194 may be, for example, $$P = \begin{bmatrix} 0 & 0 & 1 \\ 0 & 1 & 0 \\ 1 & 0 & 0 \end{bmatrix} \text{ or } P = \begin{bmatrix} 1 & 0 & 0 \\ 0 & 0 & 1 \\ 0 & 1 & 0 \end{bmatrix},$$

such that the columns of the channel matrix H are swapped when multiplied by the permutation matrix. In a modified version of the block diagram 160 of FIG. 2, rather than swapping columns of the H matrix 164, columns of the R matrix may be swapped.

The matrix decoder 162 executes over three paths 172, 174, 192 that may operate in series or in parallel. The first path 172 calculates LLR values 176 for data value associated with a third received signal, the second path 174 calculates LLR values 1178 for data value associated with a second received signal, and the third path 192 calculates LLR values 204 for data value associated with a first received signal. These LLR values 176, 178, 204 may be combined and decoded as described above with reference to FIG. 1.

The first path 172 begins at a matrix transformer 180. In the three spatial stream case, the matrix transformer 180 receives the first, second, and third signals as a 3×1 vector ($[y_1, y_2, y_3]^T$). The matrix transformer 180 transforms the y vector according to the relationship $z=Q^H y$, resulting in a 3×1 z vector ($[z_1, z_2, z_3]^T$). Specifically, in the matrix transformer 180, the relationship y=Hx+n may be multiplied by $Q^H$ to obtain $z=Q^H y=Rx+Q^H n$, which is expanded to $$\begin{bmatrix} z_1 \\ z_2 \\ z_3 \end{bmatrix} = \begin{bmatrix} r_{11} & r_{12} & r_{13} \\ 0 & r_{22} & r_{23} \\ 0 & 0 & r_{33} \end{bmatrix} \begin{bmatrix} x_1 \\ x_2 \\ x_3 \end{bmatrix} + \begin{bmatrix} n_1 \\ n_2 \\ n_3 \end{bmatrix}.$$

In the three spatial stream system, each data symbol transmitted, $x_i$ (where i=1 corresponds to data transmitted on a first spatial stream, i=2 corresponds to data transmitted on a second spatial stream, and i=3 corresponds to data transmitted on a third spatial stream) maps to n bits $\{b_1^{(i)}, b_2^{(i)}, \ldots, b_n^{(i)}\}$. $M=2^n$ is the alphabet size of the underlying modulation, such as binary phase shift keying (BPSK), quadrature amplitude modulation (QAM), etc.

Following the z transformation at 180, a minimum distance value is calculated at 182 for each of the M possible values of $x_3$. In a system using n=6 bits, the alphabet size M is equal to 64. In the three spatial stream system having the alphabet size of M, $x_1$ will have M possible values, $x_2$ will have M possible values, and $x_3$ will have M possible values, resulting in $M^3$ constellation points. The minimum distance calculated at 182 is calculated according to a formula:

$$\|z - Rx\|^2 = |z_1 - r_{11}x_1 - r_{12}x_2 - r_{13}x_3|^2 + \quad \text{(Equation 1)}$$
$$|z_2 - r_{22}x_2 - r_{23}x_3|^2 + |z_3 - r_{33}x_3|^2$$
$$= T_1 + T_2 + T_3$$

for each possible $x_3$ value. Specific $x_1$ and $x_2$ values that minimize the distance $T_1+T_2+T_3$ are determined for each possible $x_3$ value. It should be noted that the QR decomposition and z transformation procedure are of low computational complexities and do not change the statistical properties of the system. Thus, instead of minimizing the $\|y-Hx\|^2$ distance value, the less complex $\|z-Rx\|^2$ distance value can be minimized according to a sequential, "term-by-term" process described below. The term-by-term process is an algorithm that considers approximate versions of all three terms $T_1$, $T_2$, and $T_3$ and attempts to minimize the sum $T_1+T_2+T_3$ with tow computational complexity. The result is an approximate maximum likelihood solution that offers similar performance as compared to an exact maximum likelihood algorithm, while offering the lower computation complexity.

In determining the $x_1$ and $x_2$ values that minimize the distance $T_1+T_2+T_3$ for each possible $x_3$ value, a sequential, term-by-term process is employed. The term-by-term process for minimizing the distance is used instead of a process that attempts to minimize an entirety of the $T_1+T_2+T_3$ equation. In the term-by-term process, a first $x_3$ value is selected. For the first selected $x_3$ value, an $x_2$ value is calculated that minimizes the $T_2$ term of Equation 1. In other words, an $x_2$ value that minimizes the term $|z_2-r_{22}x_2-r_{23}x_3|^2$ is calculated for the first selected $x_3$ value. The $T_2$ term can be isolated and minimized in this manner because it is a function of only $x_2$ and $x_3$, where $x_3$ has been fixed to the first selected $x_3$ value. The $x_2$ value that minimizes the $T_2$ term may be determined via a slicing procedure, as described below.

Next, for the first selected $x_3$ value and the sliced $x_2$ value, an $x_1$ value is calculated that minimizes the $T_1$ term of Equation 1. In other words, an $x_1$ value that minimizes the term $|z_1 - r_{11}x_1 - r_{12}x_2 - r_{13}x_3|^2$ is calculated for the first selected $x_3$ value and the sliced $x_2$ value. The $T_1$ term can be isolated and minimized in this manner because it is a function of $x_1$, $x_2$, and $x_3$, where $x_3$ is fixed and $x_2$ is the sliced $x_2$ value previously determined. The $x_1$ value that minimizes the $T_1$ term may be determined via a slicing procedure. In one example of the slicing procedures used to determine the $x_2$ and $x_1$ values that minimize the $T_2$ and $T_1$ terms, respectively, a coordinate value F is calculated, where F is a complex number. Following calculation of F, the distance calculator 182 quantizes F to a nearest constellation point. The nearest constellation point may be used to select the $x_2$ value that minimizes the $T_2$ term and the $x_1$ value that minimizes the $T_1$ term.

The term-by-term process for minimizing the distance $T_1+T_2+T_3$ is repeated for possible $x_3$ values. In the system using n=6 bits, the alphabet size M is equal to 64, such that there are 64 possible $x_3$ values. Thus, in such a system with n=6 bits, the minimal distance for $T_1+T_2+T_3$ is repeated 64 times for each of the possible $x_3$ values. For each iteration, $x_2$ and $x_1$ values that minimize the $T_2$ and $T_1$ terms, respectively, calculated, ultimately resulting in the calculation of M $T_1+T_2+T_3$ distance values. When distance values for all possible values of $x_3$ are calculated, LLR values are calculated at 184 for the data associated with the third spatial stream, $x_3$. The calculated LLR values are output as shown at 176. The LLR value for a bit $b_k^{(i)}$ given a received vector y and a known channel matrix H may be represented as:

$$L(b_k^{(i)}) = \log\frac{P(b_k^{(i)}=1)}{P(b_k^{(i)}=0)} = \log\left\{\left(\sum_{x \in x_{k,i}} e^{-\|y-Hx\|^2/2\sigma^2}\right) \bigg/ \left(\sum_{x \in \overline{x}_{k,i}} e^{-\|y-Hx\|^2/2\sigma^2}\right)\right\},$$

where $x_{k,i}$ is the set of all possible x vectors with $b_k^{(i)}=1$, and $\overline{x}_{k,i}$ is the set of all possible x vectors with $b_k^{(i)}=0$. The following simplification, called the Max-Log Approximation, may also be utilized to calculate the LLR value for a bit $b_k^{(i)}$:

$$L(b_k^{(i)}) \approx \min_{x \in \overline{x}_{k,i}} \|y-Hx\|^2 - \min_{x \in x_{k,i}} \|y-Hx\|^2.$$

A similar process is followed along the second and third paths 174, 192 to calculate LLR values for data associated with the second spatial stream ($x_2$) and the e first spatial stream ($x_1$), respectively. At 168, the channel matrix H 164 is permutated to swap the second and third columns of the channel matrix H 164 prior to QR decomposition. Swapping the columns of H in this manner causes the value $x_2$ to be pushed down to the bottom of the x vector ($[x_1\ x_2\ x_3]^T$). Similarly, at 194, the channel matrix H 164 is permutated to swap the first and third columns of the channel matrix rix H 164 prior to QR decomposition. Swapping the columns of H in this manner causes the value $x_1$ to be pushed down to the bottom of the x vector ($[x_1\ x_2\ x_3]^T$). Following permutation of the channel matrix H 164 at 168 and 194, QR decompositions are performed at 170 and 196 on the permutated channel matrices.

The second path 174 begins at a second matrix transformer 186. In the three spatial stream case, the matrix transformer 186 receives the first, second, and third spatial stream signals as a 3×1 vector ($[y_1, y_2, y_3]^T$). The second matrix transformer 186 transforms the received y vector according to the relationship $z=Q^H y$, resulting in a 3×1 z vector ($[z_1, z_2, z_3]^T$). Following the z transformation at 186, a minimum distance value is calculated at 188 for each of the M possible values of $x_2$ in a similar manner as was described with respect to $x_3$ at 182. The minimum distance value calculated at 188 is calculated according to the formula:

$$\|z-Rx\|^2 = |z_1 - r_{11}x_1 - r_{12}x_3 - r_{13}x_2|^2 + \qquad \text{(Equation 2)}$$
$$|z_2 - r_{22}x_3 - r_{23}x_2|^2 + |z_3 - r_{33}x_2|^2$$
$$= T_1 + T_2 + T_3.$$

The term-by-term process for minimizing the distance $T_1+T_2+T_3$ of Equation 2 is utilized, and a first $x_2$ value is selected. For the first selected $x_2$ value, $x_3$ and $x_1$ values that minimize the $T_2$ and $T_1$ terms, respectively, are calculated, where the $x_3$ and $x_1$ values are calculated in the sequential, term-by-term process described above. The $x_3$ and $x_1$ values that minimize the $T_2$ and $T_1$ terms may be determined via a slicing procedure. The term-by-term process for minimizing the distance $T_1+T_2+T_3$ is repeated for all possible $x_2$ values, thus producing M $T_1+T_2+T_3$ distance values. When distance values for all possible values of $x_2$ are calculated, LLR values are calculated at 190 for the data associated with the second spatial stream, $x_2$. The calculated LLR values are output as shown at 178.

The third path 192 begins at a third matrix transformer 198. In the three spatial stream case, the matrix transformer 198 receives the first, second, and third spatial stream signals as a 3×1 vector ($[y_1, y_2, y_3]^T$). The third matrix transformer 198 transforms the received y vector according to the relationship $z=Q^H y$, resulting in a 3×1 z vector ($[z_1, z_2, z_3]^T$). Following the z transformation at 198, a minimum distance value is calculated at 200 for each of the M possible values of $x_1$ in a similar manner as was described with respect to $x_3$ and $x_2$. The minimum distance value calculated at 200 is calculated according to the formula:

$$\|z-Rx\|^2 = |z_1 - r_{11}x_2 - r_{12}x_3 - r_{13}x_1|^2 + \qquad \text{(Equation 3)}$$
$$|z_2 - r_{22}x_3 - r_{23}x_1|^2 + |z_3 - r_{33}x_1|^2$$
$$= T_1 + T_2 + T_3.$$

The term-by-term process for minimizing the distance $T_1+T_2+T_3$ of Equation 3 is utilized, and a first $x_1$ value is selected. For the first selected $x_1$ value, $x_2$ and $x_3$ values that minimize the $T_1$ and $T_2$, terms, respectively, are calculated, where the $x_2$ and $x_3$ values are calculated in the sequential, term-by-term process described above. The $x_2$ and $x_3$ values that minimize the $T_1$ and $T_2$ terms may be determined via a slicing procedure. The term-by-term process for minimizing the distance $T_1+T_2+T_3$ is repeated for all possible $x_1$ values, thus producing M $T_1+T_2+T_3$ distance values. When distance values for all possible values of $x_1$ are calculated, LLR values are calculated at 202 for the data associated with the first spatial stream, $x_1$. The calculated LLR values are output as shown at 204. The calculated LLR values 176, 178, 204 for the $x_3$, $x_2$, and $x_1$ spatial streams are passed to a decoder as soft information.

Certain approximations for metric computation may be used in the example of FIG. 2. For example, for fixed point hardware implementations, the distance approximations for the terms $T_1$, $T_2$, and $T_3$ may compute and store norm values instead of norm-square values. As an example, $|z_3-r_{33}x_3|$ may be computed instead of $|z_3-r_{33}x_3|^2$ for term $T_3$ of Equation 1. Further, various norm approximations may be used. For example, the 2-norm of complex number a+ib is approximated as $$|a+ib| \cong \max\{|a|,|b|\} + \frac{5}{16}\min\{|a|,|b|\}.$$

The term-by-term process and slicing procedure utilized in the matrix decoder 162 of FIG. 2 generates an approximate maximum likelihood solution without significant loss to performance, as compared to an exact maximum likelihood solution. The term-by-term process and slicing procedure has a lower complexity as compared to an exhaustive search or brute force methodology, potentially offering large savings in required hardware and computation time as well as higher throughput. The procedure balances complexity and performance and may result in a performance improvement in a rate-versus-range metric when using three spatial streams. Using the maximum likelihood approximation described above, it may be possible to sustain higher throughputs for longer distances as compared to conventional solutions, and the performance gain may be most significant in over-the-air (OTA) scenarios.

Although the maximum likelihood approximation is described in terms of an example using three spatial streams, the techniques described above can be extended to systems having a number of spatial streams that is greater than three and offer such systems improved performance. Further, the approximation may be used to reduce a number of receiving antennas on a device, such that the performance of a conventional system having four receiving antennas may be provided with three receiving antennas when utilizing the above-described approximations. Additionally, as described above, the system may be carried out in a parallel form for reduced latency.

Variations of the above-described procedures may be implemented. Such variants may modify the system of FIG. 2 to enable different balances between complexity and performance, for example. As an example, a "2ML" variant may utilize a $T_2+T_3$ distance equation, rather than the $T_1+T_2+T_3$ distance equation of Equations 1, 2, and 3, in the context of a MIMO system using three spatial streams. Using only terms $T_2+T_3$ may offer a lower computational complexity.

As another example, a "3ML_2PT" variant may be used. In the 3ML_2PT variant, for each possible value of $x_3$ in the constellation, the two nearest sliced $x_2$ points are stored and used to determine two nearest sliced $x_1$ points. For example, for a given $x_3$ value, a sliced $x_{21}$ value that minimizes the $T_2$ term may be used to determine a sliced $x_{11}$ value that attempts to minimize $T_1$, and a sliced $x_{22}$ value that minimizes the $T_2$ may be used to determine a sliced $x_{12}$ value that also attempts to minimize $T_1$. In this manner, the use of the multiple sliced $x_2$ points and the multiple sliced $x_1$ points may be used to better optimize the distance value $T_1+T_2+T_3$. With the two $x_2$ values and the two $x_1$ values, two sets of $T_1+T_2+T_3$ distance values are computed, and a lower of the two distance values can be used for further processing. The 3ML_2PT variant requires storage of the two sets of $T_1+T_2+T_3$ distance values and requires additional computations to obtain the additional x2 and $x_1$ values.

As another example, a "3ML_4PT" variant is an extension of the 3ML_2PT variant. In the 3ML_4PT variant, for each possible value of $x_3$ in the constellation, the four nearest sliced $x_2$ points are stored and used to determine four nearest sliced $x_1$ points. The use of the four sliced $x_2$ points and the four sliced $x_1$ points may be used to better optimize the distance value $T_1+T_2+T_3$. With the four $x_2$ values and the four $x_1$ values, four sets of $T_1+T_2+T_3$ distance values are computed, and a lowest of the four distance values can be used for further processing. The 3ML_4PT variant requires storage of the four sets of $T_1+T_2+T_3$ values.

As yet another example, a "Mod_3ML" variant may be used. In the Mod_3ML variant, the procedures described above with reference to FIG. 2 may be performed twice. For example, in a first step, for each possible $x_3$ value in the constellation, slicing may be used to determine an optimal $x_2$ value, and then slicing may be used to determine an optimal $x_1$ value (i.e., as described above with reference to FIG. 2). In a second step, for each possible $x_3$ value in the constellation, slicing may be used to determine an optimal $x_1$ value, and then slicing may be used to determine an optimal $x_2$ value. The two steps produce two sets of $T_1+T_2+T_3$ distance values, and a minimum distance value may be selected and used in further processing.

Figure 3:
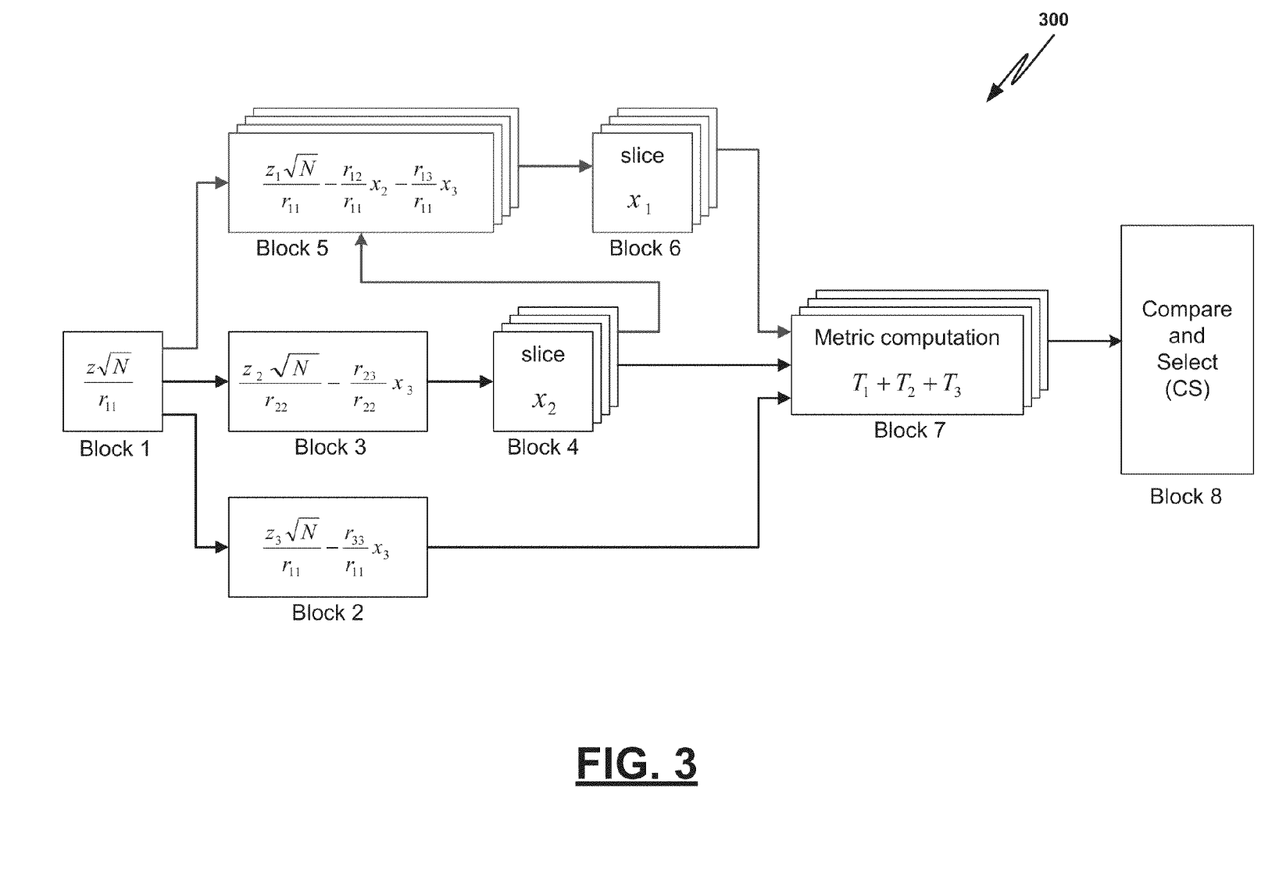
FIG. 3 is a block diagram illustrating an example implementation of a low complexity algorithm for computing LLR values for the bits in the transmitted signal $x_3$.

FIG. 3 is a block diagram 300 illustrating an example implementation of a low complexity algorithm for computing LLR values for the bits in the transmitted signal $x_3$. In FIG. 3, block 1 includes the received signal y, represented as $$\frac{z\sqrt{N}}{r_{11}},$$

where the value z results from the relationship $z=Q^H y$ and $r_{11}$ is a value from an upper triangular matrix $$R = \begin{bmatrix} r_{11} & r_{12} & r_{13} \\ 0 & r_{22} & r_{23} \\ 0 & 0 & r_{33} \end{bmatrix},$$

and where a QR decomposition of a channel matrix H is performed according to the relationship H=QR. The $\sqrt{N}$ value is a constellation-specific scaling factor. The received signal y of block 1 is received at a block 2 that is used to determine a $T_3$ value equal to $$\frac{z_3\sqrt{N}}{r_{11}} - \frac{r_{33}}{r_{11}}x_3.$$

In determining the $T_3$ value in block 2, the $x_3$ value is fixed, as described above in FIG. 2. For example, the x value is initially fixed to a first possible value of $x_3$, and using the fixed first possible value of $x_3$, $x_2$ and $x_1$ values that minimize the $T_2$ and $T_1$ terms, respectively, of a $T_1+T_2+T_3$ distance equation are determined (e.g., a $T_1+T_2+T_3$ distance equation similar to Equation 1, above).

For the fixed $x_3$ value, a term $$\frac{z_2\sqrt{N}}{r_{22}} - \frac{r_{23}}{r_{22}}x_3$$

of block 3 is sliced to determine the $x_2$ value that minimizes the $T_2$ term. The sliced $x_2$ value is stored in block 4. For the fixed $x_3$ value and the sliced $x_2$ value, a term $$\frac{z_1\sqrt{N}}{r_{11}} - \frac{r_{12}}{r_{11}}x_2 - \frac{r_{13}}{r_{11}}x_3$$

of block 5 is sliced to determine the $x_1$ value that minimizes the $T_1$ term. As illustrated in FIG. 3, block 4 is connected to block 5, such that block 5 can utilize the sliced $x_2$ value in determining the optimal $x_1$ value that minimizes the $T_1$ term. The sliced $x_1$ value is stored in block 6. In one example, slicing is performed for 16 constellation symbols at a time. Further, in one example, blocks 2-8 of FIG. 3 process 16 constellation points in every clock cycle. One tone may be processed every four clock cycles. The system of FIG. 3 may output soft metrics for one spatial stream every four clock cycles.

In block 7, a distance value equal to $T_1+T_2+T_3$ is calculated based on the fixed value, the sliced $x_2$ value, and the sliced $x_1$ value. The $T_1+T_2+T_3$ distance value may be calculated according to Equation 1, above, for example. The steps described above are repeated in blocks 1-7 for all possible values of $x_3$ to generate M distance values. The M distance values may be received at a block 8, where the M distance values are further compared and selected to obtain LLRs for the bits corresponding to $x_3$.

In a hardware implementation, three identical maximum likelihood modules may be used to compute LLRs corresponding to bits in $x_3$, $x_2$, and $x_1$ (e.g., one maximum likelihood processing module for each spatial stream). The three identical maximum likelihood modules may be configured to operate in parallel, or the maximum likelihood modules may be configured to operate in series. Each of the maximum likelihood modules may include blocks similar to blocks 1-8 of FIG. 3. In other examples, certain of blocks 1-8 may be re-used among the three maximum likelihood modules. For example, in example implementations, block 1 may be re-used among all three maximum likelihood modules.

It is further noted that in certain implementations, blocks 1-8 of FIG. 3 may be modified to be used in a 2×2 MIMO system. Specifically, by removing or disabling blocks 5 and 6, the system of FIG. 3 may be configured to be used in a 2×2 MIMO system with two spatial streams. Removing or disabling blocks 5 and 6 allows the system of FIG. 3 to be backwards compatible with existing hardware and transmission systems. In making the system of FIG. 3 backwards compatible, a search space is $(x_2, x_3)$ instead of $(x_1, x_2, x_3)$, and only blocks 1, 2, 3, 4, 7, and 8 are used. QR decomposition of the channel matrix H is performed to yield a 2×2 R matrix $$\begin{bmatrix} R_{11} & R_{12} \\ 0 & R_{22} \end{bmatrix}.$$

Thus, $r_{11}$ is replaced by $R_{11}$, $r_{33}$ is replaced by $R_{22}$, $r_{23}$ is replaced by $R_{12}$, and $r_{22}$ is replaced by a value of 1 in blocks 1, 2, and 3. In block 7, $T_1$ is set to 0.

Although computation of LLRs corresponding to bits in $x_3$ is illustrated in FIG. 3 and described above, similar block diagram configurations may be used to compute LLRs corresponding to bits in $x_2$ and $x_1$. For example, as noted above, a QR decomposition is performed to obtain an upper triangular matrix R used in computing the LLR values for $x_3$. QR decompositions can similarly be performed to obtain upper triangular matrices S and T for computing LLR values for $x_2$ and $x_1$, respectively. In block diagrams similar to the block diagram 300 of FIG. 3, the LLR values for $x_2$ and $x_1$ are computed by fixing $x_2$ and $x_1$ values, respectively, and slicing to minimize the $T_1+T_2+T_3$ distance.

Specifically, the block diagram 300 of FIG. 3 or similar block diagrams may be used in processing data for a third spatial stream $x_3$, where the QR decomposition of the channel matrix H is performed using a unitary matrix $Q_1^H$, and the y vector is transformed according to the relationship $z=Q_1^H y$, such that $$\begin{bmatrix} z_1 \\ z_2 \\ z_3 \end{bmatrix} = Q_1^H \begin{bmatrix} y_1 \\ y_2 \\ y_3 \end{bmatrix} = \begin{bmatrix} r_{11} & r_{12} & r_{13} \\ 0 & r_{22} & r_{23} \\ 0 & 0 & r_{33} \end{bmatrix} \begin{bmatrix} x_1 \\ x_2 \\ x_3 \end{bmatrix} + n'.$$

For every possible value of $x_3$, a term $z_2/r_{22} - r_{23}x_3/r_{22}$ is sliced to determine an optimal $x_2$ value. Using the fixed $x_3$ value and the sliced $x_2$ value, a term $$\frac{z_1}{r_{11}} - \frac{r_{12}x_2}{r_{11}} - \frac{r_{13}x_3}{r_{11}}$$

is sliced to determine an optimal $x_1$ value. For each bit position j of $x_3$, a soft metric LLR value is computed as $|r_{11}|(D(0)-D(1))$, where $$D(k) = \min_{x_3: x_3^{(j)}=k} \left\{ \left| \frac{z_1}{r_{11}} - x_1 - \frac{r_{12}x_2}{r_{11}} - \frac{r_{13}x_3}{r_{11}} \right| + \left| \frac{z_2}{r_{11}} - \frac{r_{22}x_2}{r_{11}} - \frac{r_{23}x_3}{r_{11}} \right| + \left| \frac{z_3}{r_{11}} - \frac{r_{33}x_3}{r_{11}} \right| \right\}$$

In processing data for a second spatial stream $x_2$, the QR decomposition of a permutated channel matrix H is performed using a unitary matrix $Q_2^H$, and the y vector is transformed to obtain a w vector according to $$\begin{bmatrix} w_1 \\ w_2 \\ w_3 \end{bmatrix} = Q_2^H \begin{bmatrix} y_1 \\ y_2 \\ y_3 \end{bmatrix} = \begin{bmatrix} s_{11} & s_{12} & s_{13} \\ 0 & s_{22} & s_{23} \\ 0 & 0 & s_{33} \end{bmatrix} \begin{bmatrix} x_1 \\ x_3 \\ x_2 \end{bmatrix} + n''.$$

In the preceding relationship, $s_{11}$, $s_{22}$, and $s_{33}$ are real values. For every possible value of $x_2$, a term $w_2/s_{22} - s_{23}x_2/s_{22}$ is sliced to determine an optimal $x_3$ value. Using the fixed $x_2$ value and the sliced $x_3$ value, a term $w_1/s_{11} - s_{13}x_2/s_{11} - s_{12}x_3/s_{11}$ is sliced to determine an optimal $x_1$ value. For each bit position j of $x_2$, a soft metric LLR value is computed as $|s_{11}|(D(0)-D(1))$, where $$D(k) = \min_{x_2:x_2^{(j)}=k} \left\{ \left| \frac{w_1}{s_{11}} - x_1 - \frac{s_{12}x_2}{s_{11}} - \frac{s_{13}x_3}{s_{11}} \right| + \right.$$
$$\left. \left| \frac{w_2}{s_{11}} - \frac{s_{22}x_3}{s_{11}} - \frac{s_{23}x_3}{s_{11}} \right| + \left| \frac{w_3}{s_{11}} - \frac{s_{33}x_2}{s_{11}} \right| \right\}.$$

In processing data for a first spatial stream $x_1$, the QR decomposition of a permutated channel matrix H is performed using a unitary matrix $Q_3^H$, and the y vector is transformed to obtain a v vector according to $$\begin{bmatrix} v_1 \\ v_2 \\ v_3 \end{bmatrix} = Q_3^H \begin{bmatrix} y_1 \\ y_2 \\ y_3 \end{bmatrix} = \begin{bmatrix} t_{11} & t_{12} & t_{13} \\ 0 & t_{22} & t_{23} \\ 0 & 0 & t_{33} \end{bmatrix} \begin{bmatrix} x_2 \\ x_3 \\ x_1 \end{bmatrix} + n'''.$$

In the preceding relationship, $t_{11}, t_{22}$, and $t_{33}$ are real values. For every possible value of $x_1$, a term $v_2/t_{22} - t_{23}x_1/t_{22}$ is sliced to determine an optimal $x_3$ value. Using the fixed $x_1$ value and the sliced $x_3$ value, a term $v_1/t_{11} - t_{12}x_3/t_{11} - t_{13}x_1/t_{11}$ is sliced to determine an optimal $x_2$ value. For each bit position j of $x_1$, a soft metric LLR value is computed as $|t_{11}|(D(0)-D(1))$, where $$D(k) = \min_{x_1:x_1^{(j)}=k} \left\{ \left| \frac{v_1}{t_{11}} - \frac{t_{13}x_1}{t_{11}} - \frac{t_{12}x_3}{t_{11}} - x_2 \right| + \right.$$
$$\left. \left| \frac{v_2}{t_{11}} - \frac{t_{23}x_1}{t_{11}} - \frac{t_{22}x_3}{t_{11}} \right| + \left| \frac{v_3}{t_{11}} - \frac{t_{33}x_1}{t_{11}} \right| \right\}.$$

The above-described QR decompositions and matrix transformations to obtain LLR values for $x_1$, $x_2$, and $x_3$ may be performed in parallel or in series.

Figure 4:
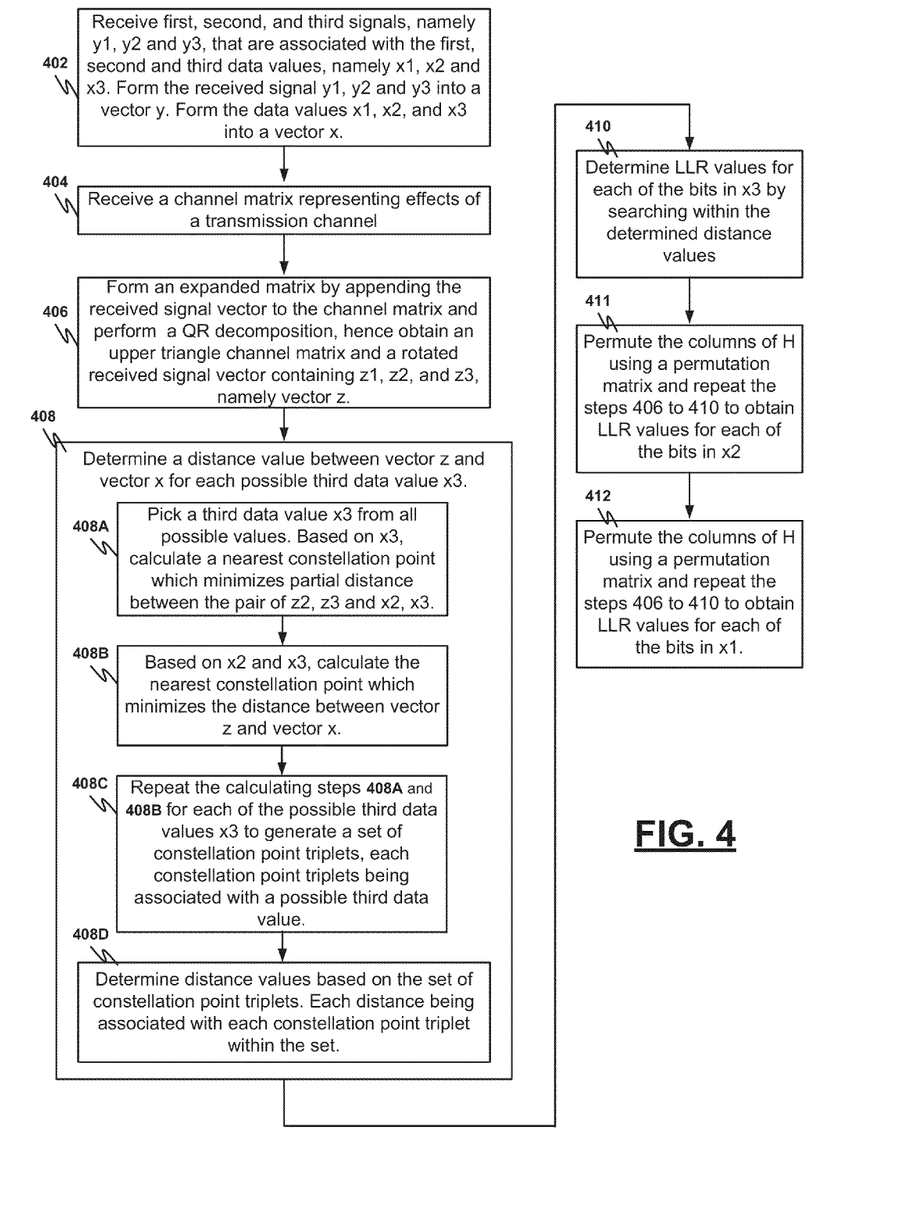
FIG. 4 is a flowchart illustrating an example method for detecting data in a received multiple-input-multiple-output (MIMO) signal using the low complexity algorithm disclosed above with reference to FIGS. 1-3.

FIG. 4 is a flowchart illustrating an example method for detecting data in a received multiple-input-multiple-output (MIMO) signal using the low complexity algorithm disclosed above with reference to FIGS. 1-3. At 402, first, second, and third signals, namely y1, y2 and y3, are received that are associated with the first, second, and third data values, namely x1, x2 and x3. The received signals y1, y2, and y3 are formed into a vector y. The data values x1, x2, and x3 are formed into a vector x. For example, the vector y may be ([y1, y2, y3]$^T$), and the vector x may be ([x1, x2, x3]$^T$). At 404, a channel matrix representing effects of a transmission channel is received. For example, the channel matrix H may be a 3×3 vector, $$\begin{bmatrix} h_{11} & h_{12} & h_{13} \\ h_{21} & h_{22} & h_{23} \\ h_{31} & h_{32} & h_{33} \end{bmatrix},$$

where the channel matrix H represents combined effects of the transmission channel and spatial mapping of a MIMO transmitter on the transmitted signal. At 406, an expanded matrix is formed by appending the received signal vector to the channel matrix and performing a QR decomposition, hence obtaining an upper triangle channel matrix and a rotated received signal vector containing z1, z2, and z3, namely vector z. The upper triangle channel matrix may be $$\begin{bmatrix} r_{11} & r_{12} & r_{13} \\ 0 & r_{22} & r_{23} \\ 0 & 0 & r_{33} \end{bmatrix},$$

and the rotated received signal vector may be ([z1, z2, z3]$^T$).

At 408, a distance value between vector z and vector x is determined for each possible third data value x3. Specifically, at 408A, a third data value x3 from all possible values is selected. Based on the selected x3, a nearest constellation point which minimizes partial distance between the pair of z2, z3 and x2, x3 is selected. At 408B, based on x2 and x3, the nearest constellation point which minimizes the distance between vector z and vector x is calculated. As described above, with reference to FIGS. 2 and 3, steps 408A and 408B are implemented using a term-by-term process. The term-by-term process is an algorithm that attempts to minimize the distance between vector z and vector x with low computational complexity. At 408C, the calculating steps 408A and 408B are repeated for each of the possible third data values x3 to generate a set of constellation point triplets, where each constellation point triplet is associated with a possible third data value. At 408D, distance values based on the set of constellation point triplets are determined. Each distance value is associated with a particular constellation point triplet within the set.

At 410, LLR values are determined for each of the bits in x3 by searching within the determined distance values. At 411, the columns of H are permuted using a permutation matrix, and the steps 406 to 410 are repeated to obtain LLR values for each of the bits in x2. At 412, the columns of H are permuted using a permutation matrix, and the steps 406 to 410 are repeated to obtain LLR values for each of the bits in x1. The calculated LLR values are combined by an LLR combiner and provided to a decoder. The decoder may be, for example, a low-density parity-check (LDPC) decoder or a convolutional decoder. The decoder decodes the received spatial streams using the LLR values provided by the combiner and generates informational bits as output data.

Figure 5:
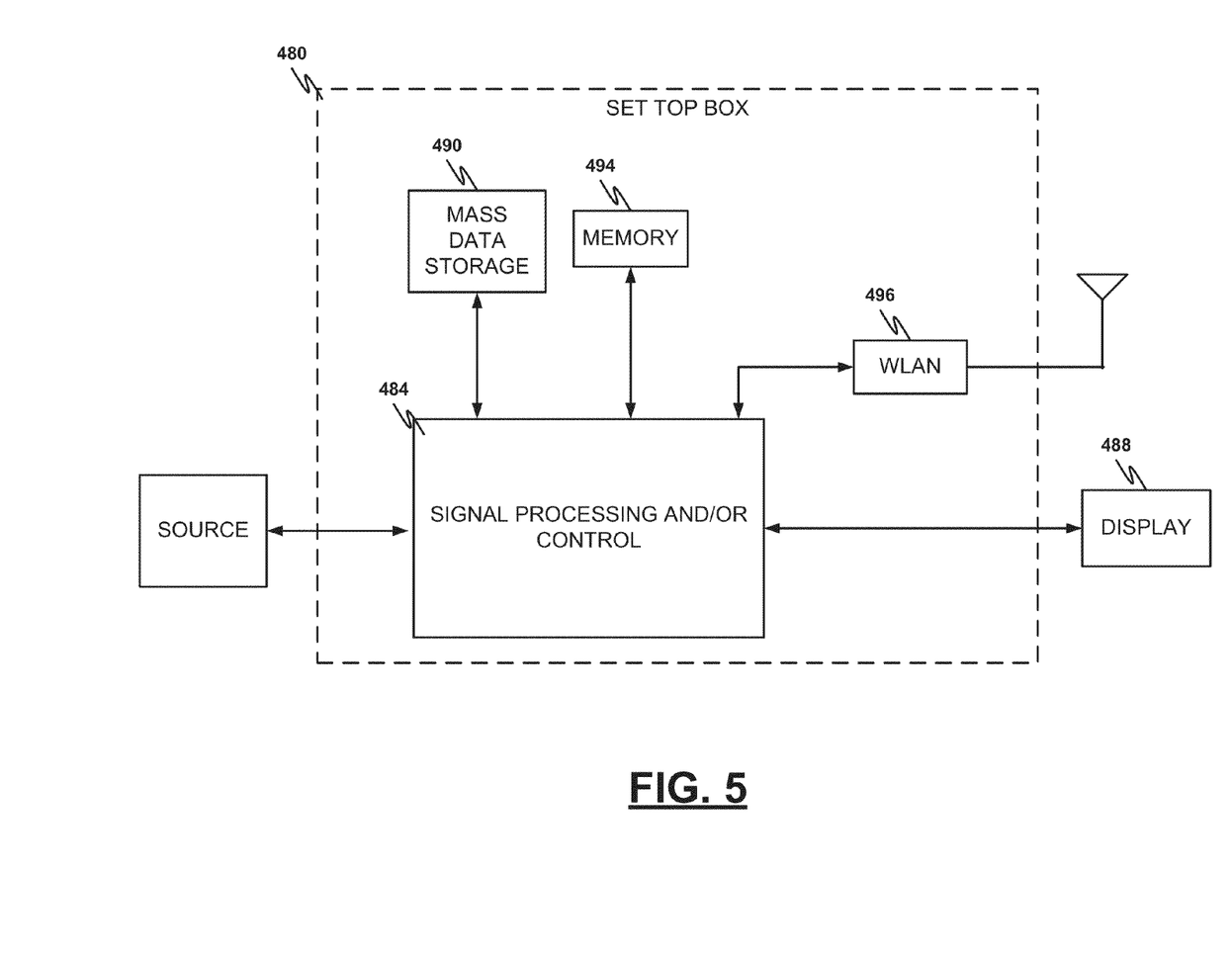
FIG. 5 depicts an example device illustrating an implementation of the present disclosure.

FIG. 5 depicts an example device 480 illustrating an implementation of the present disclosure. The device 480 can be any device capable of wireless communication—e.g., a cellular phone, set top box, smart phone, computer system, and the like. The present invention may implement signal processing or control circuits 484, a WLAN interface 496, or mass data storage 490 of the device 480. Signal processing or control circuits 484 or other circuits (not shown) of the device 480 may process data, perform coding or encryption, perform calculations, format data, or perform any other function as required by an application for the device 480.

The device 480 may communicate with mass data storage 490 that stores data in a nonvolatile manner. Mass data storage 490 may include optical or magnetic storage devices, for example hard disk drives HDD or DVD drives. The device 480 may be connected to memory 494 such as RAM, ROM, low latency nonvolatile memory such as flash memory, or other suitable electronic data storage. The device 480 may also support connections with a WLAN via the WLAN network interface 496.

This written description uses examples to disclose the invention, including the best mode, and also to enable a person skilled in the art to make and use the invention. It should be noted that the systems and methods described herein may be equally applicable to other frequency modulation encoding schemes. The patentable scope of the invention may include other examples.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method of detecting data in a received multiple-input-multiple-output (MIMO) signal, the method comprising:
   receiving, via a transmission channel, a first signal (y1), a second signal (y2), and a third signal (y3) on first, second, and third spatial streams, respectively, wherein the received signals are associated with first data values (x1), second data values (x2), and third data values (x3);
   forming the first signal, the second signal, and the third signal into a received signal vector y;
   forming the first data values, the second data values, and the third data values into a vector x;
   receiving a channel matrix (H) representing effects of the transmission channel on the first data values, the second data values, and the third data values;
   performing a QR decomposition of the channel matrix, such that H=QR, wherein Q matrix is a unitary matrix and R matrix is an upper triangular matrix;
   transforming the received signal vector y into a rotated received signal vector z according to $z=Q^H y$;
   determining a distance value between the vector z and the vector x for each possible third data value (x3), the determining including:
     calculating a nearest constellation point based on a first of the possible third data values (x3), wherein the nearest constellation point minimizes a distance between vector z and vector x,
     repeating the calculating step for each of the possible third data values (x3) to generate a set of constellation point triplets, wherein one constellation point triplet is associated with each of the possible third data values (x3), and
     determining a distance value between the vector z and the vector x using the set of constellation point triplets, and further using elements of the channel matrix, wherein one distance value is associated with each of the constellation point triplets of the set; and
   determining one or more log likelihood ratio (LLR) values based on the determined distance values.

2. The method of claim 1, further comprising:
   permutating columns of the channel matrix by multiplying the channel matrix by a permutation matrix;
   determining a second distance value between the vector z and the vector x for each possible second data value (x2), the determining including:
     calculating a nearest constellation point based on a first of the possible second data values (x2), wherein the nearest constellation point minimizes a distance between vector z and vector x,
     repeating the calculating step for each of the possible second data values (x2) to generate a second set of constellation point triplets, wherein one constellation point triplet is associated with each of the possible second data values (x2), and
     determining a second distance value between the vector z and the vector x using the second set of constellation point triplets, and further using elements of the permutated channel matrix, wherein one second distance value is associated with each of the constellation point triplets of the second set; and
   determining one or more second LLR values based on the determined second distance values.

3. The method of claim 2, further comprising:
   permutating the columns of the channel matrix by multiplying the channel matrix by the permutation matrix, wherein the permutation matrix is $$P = \begin{bmatrix} 0 & 0 & 1 \\ 0 & 1 & 0 \\ 1 & 0 & 0 \end{bmatrix}$$

or $$P = \begin{bmatrix} 1 & 0 & 0 \\ 0 & 0 & 1 \\ 0 & 1 & 0 \end{bmatrix}.$$

4. The method of claim 2, further comprising:
   permutating the columns of the channel matrix by multiplying the channel matrix by a second permutation matrix;
   determining a third distance value between the vector z and the vector x for each possible first data value (x1), the determining including:
     calculating a nearest constellation point based on a first of the possible first data values (x1), wherein the nearest constellation point minimizes a distance between vector z and vector x,
     repeating the calculating step for each of the possible first data values (x1) to generate a third set of constellation point triplets, wherein one constellation point triplet is associated with each of the possible first data values (x1), and
     determining a third distance value between the vector z and the vector x using the third set of constellation point triplets, and further using elements of the permutated channel matrix, wherein one third distance value is associated with each of the constellation point triplets of the third set; and
   determining one or more third LLR values based on the determined third distance values.

5. The method of claim 4, further comprising:
   decoding the one or more first data values, the one or more second data values, and the one or more third data values based on the first, second, and third LLR values.

6. The method of claim 1, further comprising:
   determining the one or more LLR values, wherein the one or more LLR values are determined without an exhaustive search of all possible first signal values and all possible second signal values.

7. The method of claim 1, further comprising:
   determining a first distance value and a second distance value for each possible third data value (x3), the determining including:

calculating a first nearest constellation point and a second nearest constellation point based on the first of the possible third data values (x3),
repeating the calculating step for each of the possible third data values to generate the set of constellation point triplets, wherein two constellation point triplets are associated with each of the possible third data values (x3), and
determining a first distance value and a second distance value between the vector z and the vector x using the set of constellation point triplets, wherein two distance values are associated with each of the possible third data values (x3).

8. The method of claim 1, further comprising:
determining four distance values for each possible third data value (x3), the determining including:
calculating four nearest constellation points based on the first of the possible third data values (x3),
repeating the calculating step for each of the possible third data values to generate the set of constellation point triplets, wherein four constellation point triplets are associated with each of the possible third data values (x3), and
determining four distance values between the vector z and the vector x using the plurality of constellation point triplets, wherein four distance values are associated with each of the possible third data values (x3).

9. The method of claim 1, further comprising:
calculating the nearest constellation point based on the first of the possible third data values, wherein the calculating utilizes a slicing procedure.

10. A method of detecting data in a received multiple-input-multiple-output (MIMO) signal, the method comprising:
receiving, via a transmission channel, a first signal ($y_1$), a second signal ($y_2$), and a third signal ($y_3$) on first, second, and third spatial streams, respectively, wherein the received signals are associated with first data values ($x_1$), second data values ($x_2$), and third data values ($x_3$), wherein the first, second, and third signals form a y-vector ($[y_1, y_2, y_3]^T$), and wherein the first, second, and third data values form an x-vector ($[x_1, x_2, x_3]^T$);
receiving a channel matrix (H) representing effects of the transmission channel on the one or more first data values, the one or more second data values, and the one or more third data values;
performing a QR decomposition of the channel matrix, such that H=QR, wherein Q matrix is a unitary matrix and R matrix is $$\begin{bmatrix} r_{11} & r_{12} & r_{13} \\ 0 & r_{22} & r_{23} \\ 0 & 0 & r_{33} \end{bmatrix};$$

transforming the y-vector to a z-vector ($[z_1, z_2, z_3]^T$) according to $z=Q^H y$;
determining a distance value between the z-vector and the x-vector for each possible third data value ($x_3$), the determining including:
calculating a particular second data value ($x_2$) that minimizes a term $|z_2 - r_{22}x_2 - r_{23}x_3|^2$ for a first of the possible third data values ($x_3$),
calculating a particular first data value $x_1$ that minimizes a term $|z_1 - r_{11}x_1 - r_{12}x_2 - r_{13}x_3|^2$ for the first of the possible third data values ($x_3$) and the particular second data value (x2),
calculating a distance value between the z-vector and the x-vector for the first of the possible third data values ($x_3$) using the particular second data value ($x_2$) and the particular first data value ($x_1$), and
repeating the calculating steps for each of the possible third data values ($x_3$) so that one distance value is associated with each possible third data value ($x_3$);
determining one or more log likelihood ratio (LLR) values based on the determined distance values; and
decoding the third data value ($x_3$) based on the one or more LLR values.

11. The method of claim 10, further comprising:
repeating the steps of performing, transforming, and determining the distance value, wherein the repeated steps utilize a modified channel matrix that is equal to the received channel matrix (H) multiplied by a first permutation matrix that is $$P = \begin{bmatrix} 0 & 0 & 1 \\ 0 & 1 & 0 \\ 1 & 0 & 0 \end{bmatrix}$$

or $$P = \begin{bmatrix} 1 & 0 & 0 \\ 0 & 0 & 1 \\ 0 & 1 & 0 \end{bmatrix},$$

wherein the repeated steps utilize a symbolic interchange between the third data value ($x_3$) and the second data value ($x_2$), and wherein the repeated steps generate distance values for each possible second data value ($x_2$); and
decoding the second data value ($x_2$) based on the generated distance values for each possible second data value.

12. The method of claim 11, further comprising:
repeating the steps of performing, transforming, and determining the distance value, wherein the repeated steps utilize a modified charnel matrix that is equal to the received channel matrix (H) multiplied by a first permutation matrix that is $$P = \begin{bmatrix} 0 & 0 & 1 \\ 0 & 1 & 0 \\ 1 & 0 & 0 \end{bmatrix}$$

or $$P = \begin{bmatrix} 1 & 0 & 0 \\ 0 & 0 & 1 \\ 0 & 1 & 0 \end{bmatrix}.$$

wherein the repeated steps utilize a symbolic interchange between the third data value ($x_3$) and the first data value ($x_1$), and wherein the repeated steps generate distance values for each possible first data value ($x_1$); and
decoding the first data value ($x_1$) based on the generated distance values for each possible first data value.

13. The method of claim 10, further comprising:
calculating the distance value for the first of the possible third data values ($x_3$) using the particular second data value ($x_2$) and the particular first data value ($x_1$), wherein the distance value is calculated according to $\|z-Rx\|^2 = |z_1 - r_{11}x_1 - r_{12}x_2 - r_{13}x_3|^2 + |z_2 - r_{22}x_2 - r_{23}x_3|^2 + |z_3 - r_{33}x_3|^2$.

14. The method of claim 10, further comprising:
calculating the distance value using a norm approximation.

15. The method of claim 10, further comprising:
determining a first distance value and a second distance value for each possible third data value ($x_3$), the determining including:
  determining two nearest second data values ($x_2$) that minimize the term $|z_2 - r_{22}x_2 - r_{23}x_3|^2$ for the first of the possible third data values ($x_3$), and
  determining two nearest first data values ($x_1$) based on the two nearest second data values ($x_2$).

16. The method of claim 10, further comprising:
determining four distance values for each possible third data value ($x_3$), the determining including:
  determining four nearest second data values ($x_2$) that minimize the $|z_2 - r_{22}x_2 - r_{23}x_3|^2$ for the first of the possible third data values ($x_3$), and
  determining four nearest first data values ($x_1$) based on the four nearest second data values ($x_2$).

17. The method of claim 10, further comprising:
for the first possible third data value ($x_3$), performing a first slicing procedure to determine a first nearest second data value ($x_2$);
using the first nearest second data value ($x_2$), performing a second slicing procedure to determine a first nearest first data value ($x_1$);
for the first possible third data value ($x_3$), performing a third slicing procedure to determine a second nearest first data value ($x_1$); and
using the second nearest first data value ($x_1$), performing a fourth slicing procedure to determine a second nearest second data value ($x_2$).

18. The method of claim 10, further comprising:
determining the one or more LLR values, wherein the one or more LLR values are determined without an exhaustive search of all possible first signal values and all possible second signal values.

19. A system for detecting data in a received multiple-input-multiple-output (MIMO) signal, the system comprising:
one or more antennas configured to receive, via a transmission channel, a first signal (y1), a second signal (y2), and a third signal (y3) on first, second, and third spatial streams, respectively, wherein the received signals are associated with first data values (x1), second data values (x2), and third data values (x3), wherein the first signal, the second signal, and the third signal form a received signal vector y, and wherein the first data values, the second data values, and the third data values form a vector x;
a QR decomposer configured to transform a channel matrix (H) representing effects of the transmission channel on the first data values, the second data values, and the third data values, wherein the channel matrix is transformed via a QR decomposition, such that H=QR, wherein Q matrix is a unitary matrix and R matrix is an upper triangular matrix;
a matrix transformer configured to transform the received signal vector y into a rotated received signal vector z according to $z = Q^H y$; and
a distance value determiner configured to determine a distance value between the vector z and the vector x for each possible third data value (x3), the distance value determiner being configured to:
  calculate a nearest constellation point based on a first of the possible third data values (x3), wherein the nearest constellation point minimizes a distance between vector z and vector x,
  repeat the calculating step for each of the possible third data values (x3) to generate a set of constellation point triplets, wherein one constellation point triplet is associated with each of the possible third data values (x3), and
  determine a distance value between the vector z and the vector x using the set of constellation point triplets, and further using elements of the channel matrix, wherein one distance value is associated with each of the constellation point triplets of the set.

20. The system of claim 19, further comprising:
a memory programmed to store the channel matrix (H), wherein the distance value determiner utilizes elements of the channel matrix in calculating the distance value.

* * * * *